Nov. 3, 1925.

F. GELSTHARP 1,560,078

APPARATUS FOR MAKING SHEET GLASS

Filed May 7, 1923

6 Sheets-Sheet 1

INVENTOR

Frederick Gelstharp by

James C. Bradley atty.

Nov. 3, 1925.

F. GELSTHARP 1,560,078

APPARATUS FOR MAKING SHEET GLASS

Filed May 7, 1923

6 Sheets-Sheet 2

INVENTOR
Frederick Gelstharp.
by
James C. Bradley
Atty.

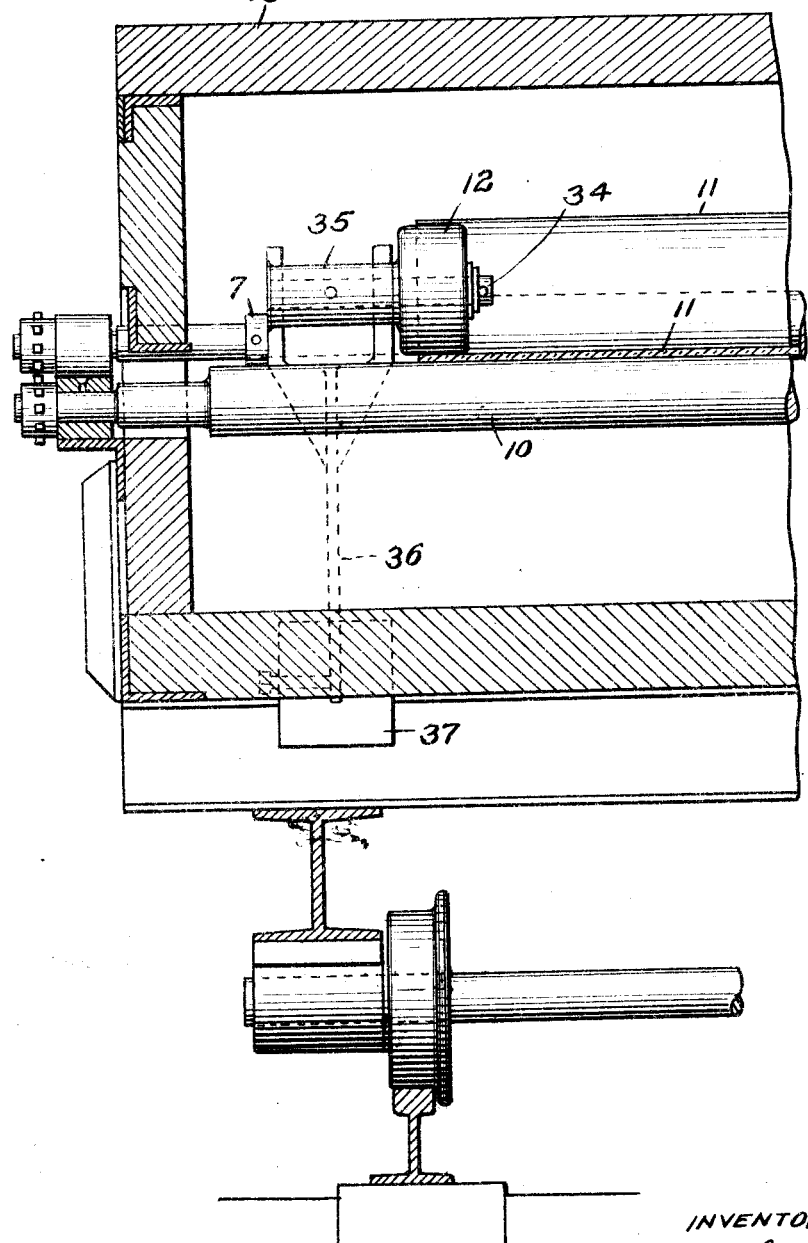

Nov. 3, 1925.
F. GELSTHARP
1,560,078
APPARATUS FOR MAKING SHEET GLASS
Filed May 7, 1923 6 Sheets-Sheet
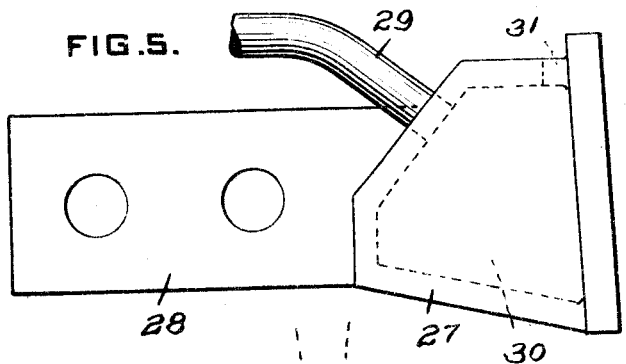
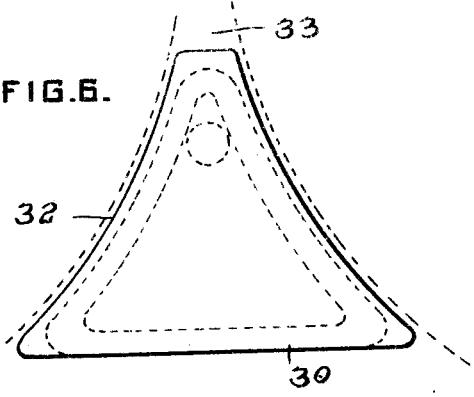
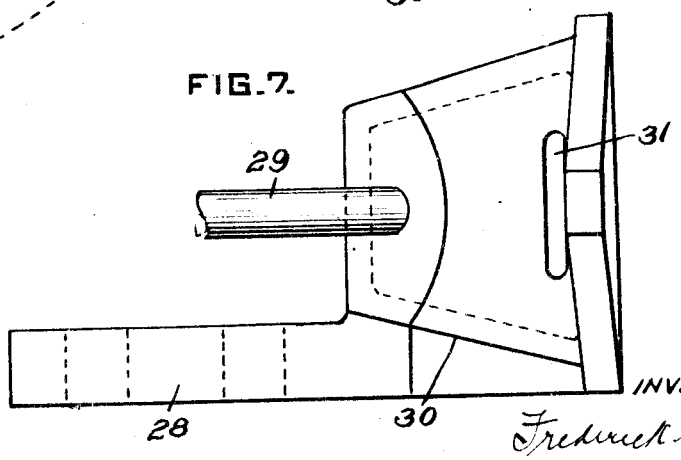
INVENTOR
Frederick Gelstharp
by James C. Bradley
atty Nov. 3, 1925.
F. GELSTHARP
1,560,078
APPARATUS FOR MAKING SHEET GLASS
Filed May 7, 1923
6 Sheets-Sheet 5

INVENTOR

Nov. 3, 1925.   1,560,078

F. GELSTHARP

APPARATUS FOR MAKING SHEET GLASS

Filed May 7, 1923    6 Sheets-Sheet 6

INVENTOR
Frederick Gelstharp
by
James C. Bradley
atty

Patented Nov. 3, 1925

1,560,078

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

APPARATUS FOR MAKING SHEET GLASS.

Application filed May 7, 1923. Serial No. 637,126.

*To all whom it may concern:*

Be it known that I, FREDERICK GELSTHARP, a citizen of the United States, and a resident of Tarentum, in the county of Allegheny and State of Pennsylvania, have made a new and useful invention in Improvements in Apparatus for Making Sheet Glass, of which the following is a specification.

Figure 1:
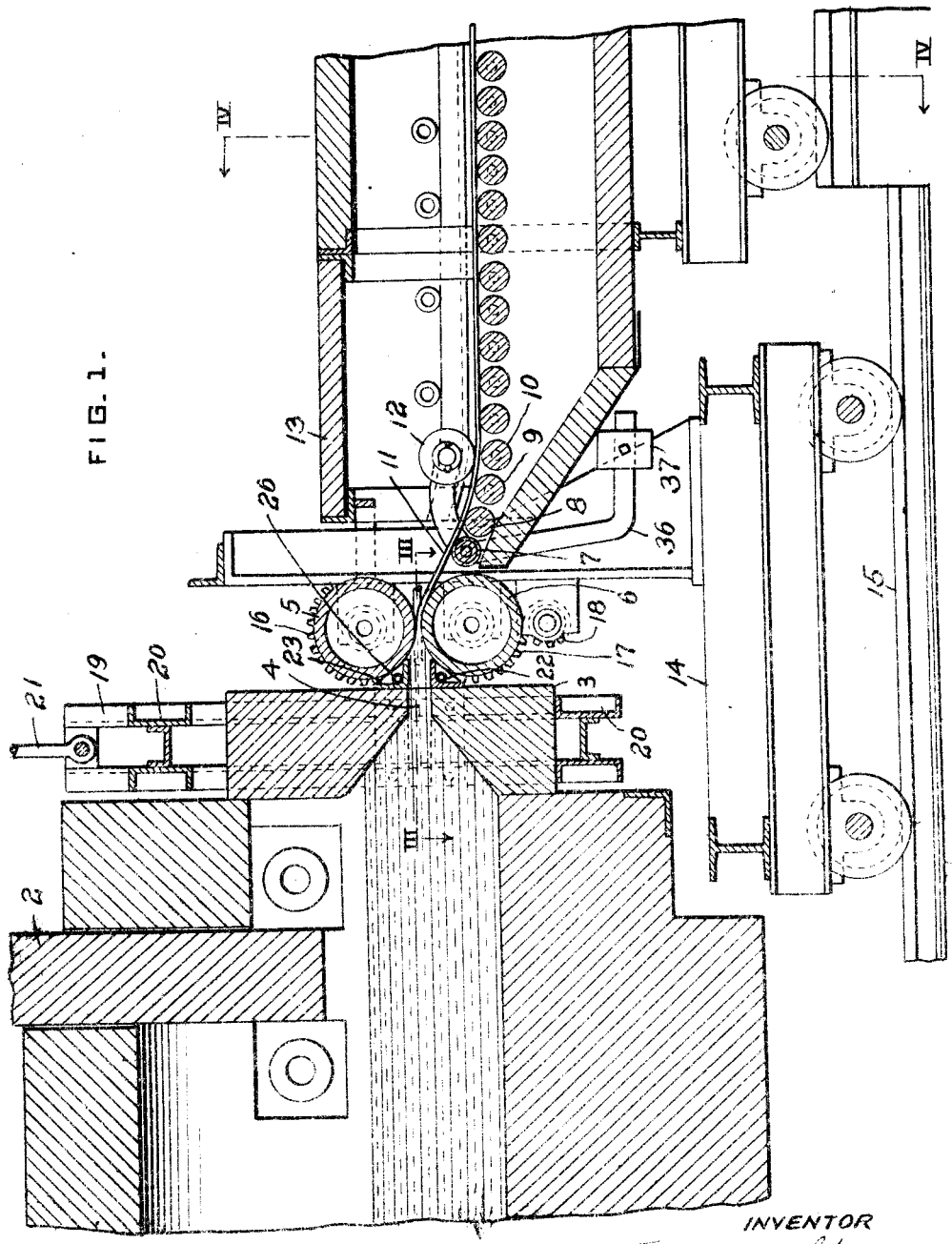
Figure 2:
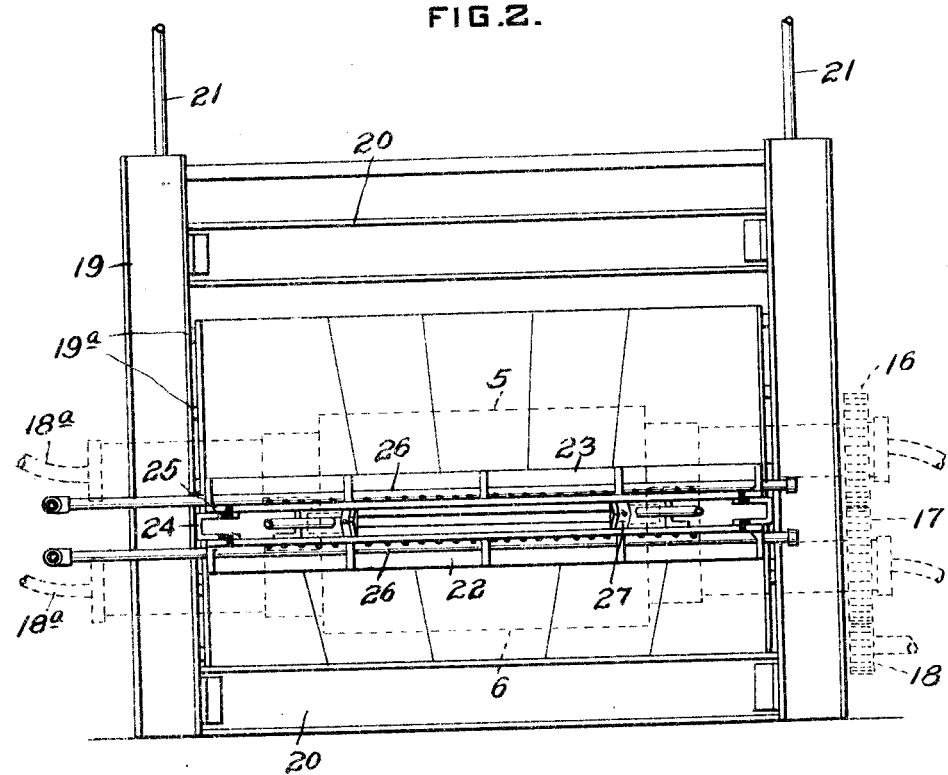
Figure 3:
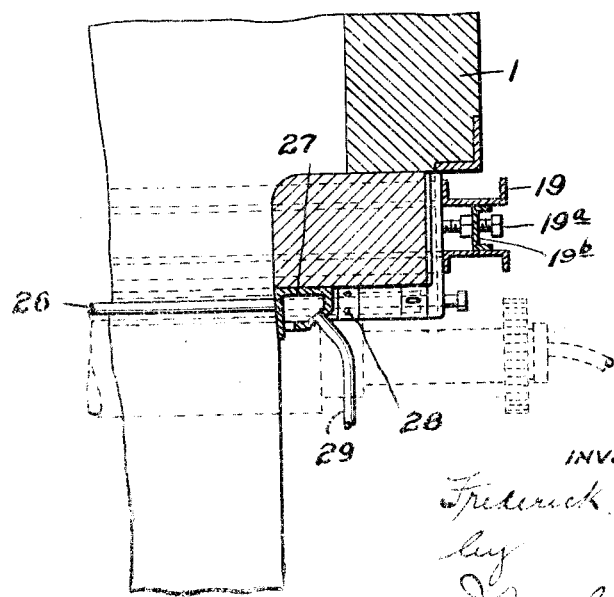
Figure 8:
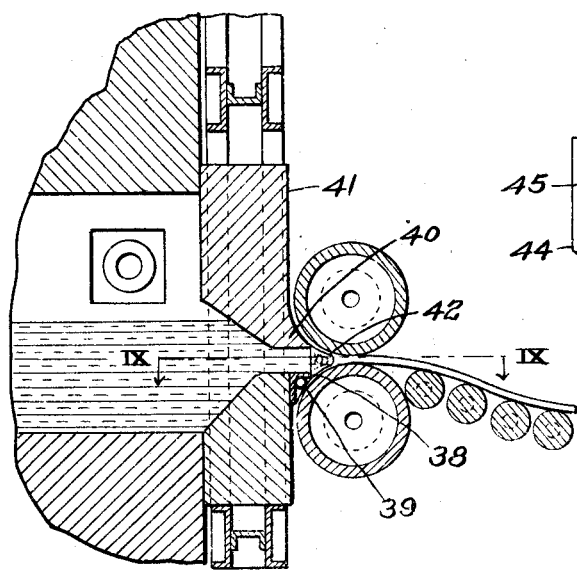
Figure 9:
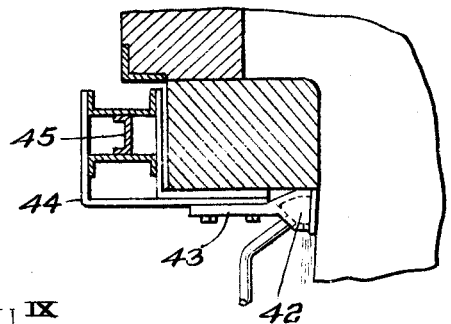
Figure 10:
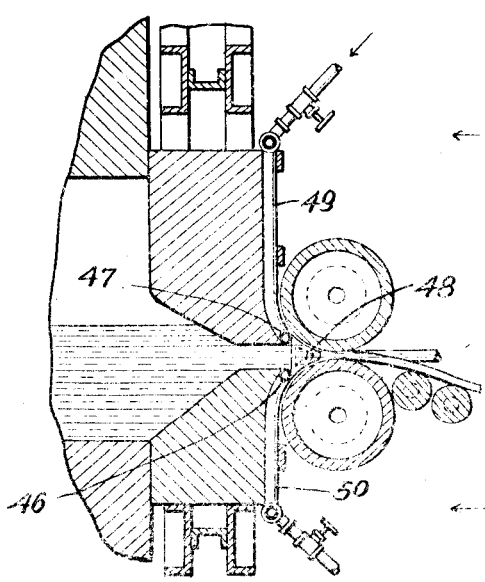
Figure 11:
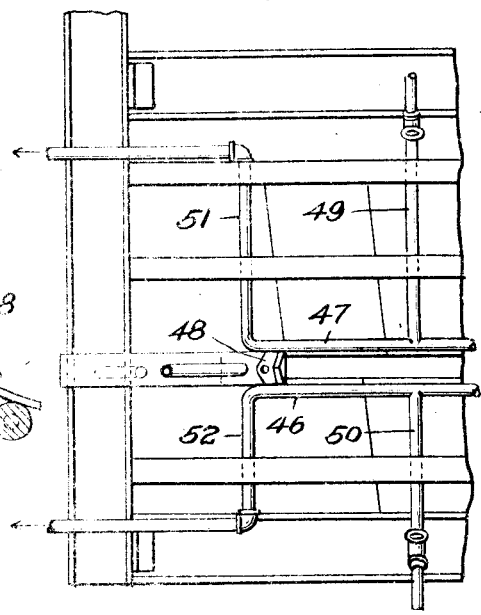
Figure 12:
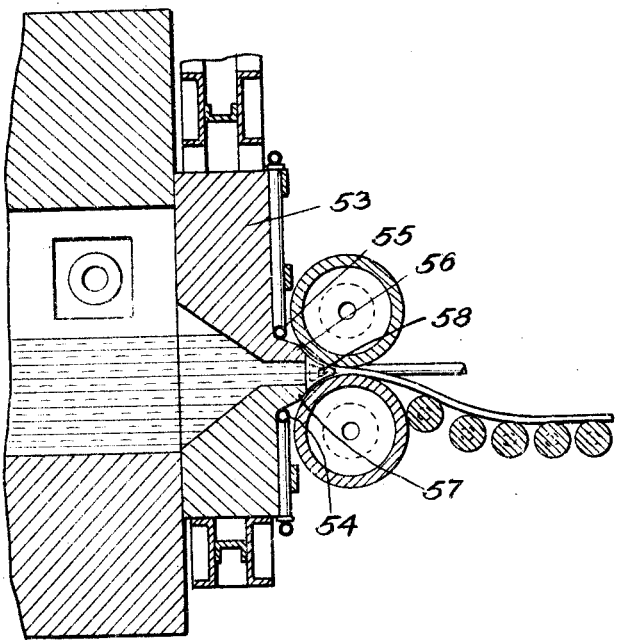
Figure 13:
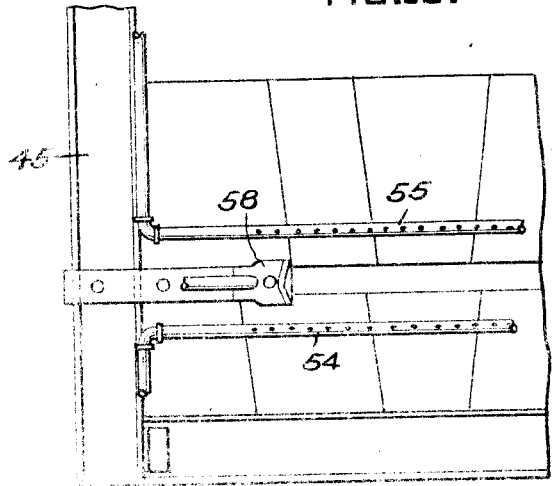

This invention relates to apparatus for making sheet glass continuously from a tank by a rolling operation along the lines set forth in my application Serial No. 656,441 and involves certain modifications of and improvements over, the apparatus of such application. It has for its principal objects the provision of means, (1) for improving the edges of the continuous ribbon or sheet, (2) for eliminating the bubbles which are at times introduced into the sheet intermediate the clay outlet slot from the tank and the rolls, (3) for eliminating the slight upturning of the extreme edges of the sheet which tends to occur intermediate the rolls and the leer, (4) and for mounting the slot member of the tank so that it may be readily removed and replaced or adjusted vertically. Certain embodiments of the invention are illustrated in the accompanying drawings wherein:

Figure 1 is a vertical section through an apparatus embodying the invention. Fig. 2 is a front elevation of the apparatus of Fig. 1 with the rolls and leer removed to show the construction behind the rolls. Fig. 3 is a horizontal section on the line III—III of Fig. 1 at one side of the tank. Fig. 4 is a vertical section on the line IV—IV of Fig. 1. Figs. 5, 6 and 7 are detail views of the hollow metal closure members at the ends of the rolls. Fig. 8 is a vertical section showing a modification. Fig. 9 is a horizontal section on the line IX—IX of Fig. 8 showing the method of supporting the hollow triangular members. Fig. 10 is a vertical section showing another modification. Fig. 11 is a front elevation of the Fig. 10 construction with the rolls removed. And Figs. 12 and 13 are views similar to Figs. 10 and 11 but illustrating a further modification.

Referring first to the construction of Figs. 1 to 7, the principal parts are as follows: 1 is the forehearth or end of a melting tank; 2 is a gate or shear cake suspended from above and operated by means not shown; 3 is a clay outlet member having the outlet passage 4; 5 and 6 are hollow water cooled rolls connected with suitable driving mechanism; 7, 8, 9, 10, etc. are a series of rolls for supporting the glass sheet or ribbon 11 after it leaves the rolls 5 and 6; 12 are flattening rolls at the edges of the sheets; 13 is the rear end of the flattening and annealing leer into which the glass sheet is conducted; and 14 is a truck which carries the rolls 5 and 6 and is mounted upon the rails 15.

The rolls 5 and 6, which are shown in dotted lines in Fig. 2 in order not to interfere with a view of the parts behind but at the same time to indicate their position, are provided at their ends with intermeshing spur gears 16 and 17 driven from a pinion 18, the method of driving the rolls being unimportant and being illustrated in the application heretofore referred to. The rolls are hollow and water cooled as set forth in said application, the pipes 18$^a$ being connected to swivels at the ends of the rolls as set forth in said application and constituting no part of the present invention.

The clay outlet member 3 is provided with a frame consisting of the vertical channels 19 and the horizontal channels 20 suitably secured together in such way as to support the member 3. A clamping effect upon the sides of the member 3 is accomplished by means of the bolts 19$^a$ (Figs. 2 and 3) which extend through the webs of the channels 19$^b$. In order to provide for the vertical adjustment of this member and also for its removal and replacement, it is suspended from above by means of the hangers 21 which are connected to a suitable overhead crane. Since this outlet member is mounted independent of the body portion of the tank and of the rolls, it may be readily removed for replacement or repair after the shear cake 2 has been dropped into the glass. At this time the truck 14 carrying the rolls is moved forward sufficiently to secure proper clearance between the rolls and outlet member.

Located between the outlet member 3 and the rolls 5 and 6 are the metal lips 22 and 23, such lips being preferably composed of heat resisting metal. These lips are carried upon the U-shaped brackets 24 riveted to the flanges of the channels 19. The brackets are slotted as indicated at 25 and bolts are passed through the members 22 and 23 and through these slots so that such members may contract and expand without buckling. These lip members 22 and 23 are preferably cooled by means of perforated air pipes 26 although they might be cooled by radiation from similar pipes without the perforations by the use of water or other suitable cooling liquid. I have found that the use of these cooled lips between the outlet and the rolls tends to eliminate bubbles which are otherwise sometimes produced in the glass when the glass passes directly from the clay lips to the rolls. I believe that this result is due to the fact that the surfaces of the layer of glass passing through the lips are so chilled that when these surfaces strike the rolls, any minute air pockets due to irregularities over which the glass surface has passed, are prevented from becoming incorporated into the sheet because of the increased resistance of the chilled surface to penetration by the particles or bubbles of air.

This chilling of the surfaces of the layer of glass preliminary to its contact with the rolls may be accomplished in a variety of ways as hereinafter set forth and is particularly important in connection with the lower side of the layer, at which side the tendency to produce bubbles is most marked. The amount of chilling of the glass secured between the outlet member and the rolls depends on the width of the metal lips and the thickness of the metal, and these factors might be made such that too much chilling might be secured even without the application of air from the pipes, in which case the temperature might be increased by circulating a heating medium through the pipes or by using them as burner pipes. The invention contemplates broadly the application of temperature controlling means for the metal lips intermediate the clay outlet member and the rolls.

In order to close the triangular spaces at the ends of the rolls, the hollow metal members 27 are preferably employed, such members being secured by means of the flanges 28 which are bolted to one of the lips. These hollow members, which are shown in detail in Figs. 5 to 7 may be made of cast iron, but are preferably made of heat resisting metal, such as a nickel chromium alloy. They are provided with burner pipes 29 through which an explosive mixture of gas and air is introduced to the chamber 30. The metal is at such a high temperature that the gas ignites upon contacting with the interior surface of the chamber and thus gives surface combustion with a corresponding high temperature. Provision is made for the escape of the gases of combustion through the slots 31.

The sides 32 of the members are preferably spaced away from the surfaces of the rolls 5 and 6 as indicated in Fig. 6, as the temperature of the members is more easily maintained if they are out of contact with the surfaces of the water cooled rolls. The ends of the members are also preferably truncated or cut off as indicated in Fig. 6. It has been found that a better edge is secured upon the sheet or ribbon of glass when highly heated closure members of this type are employed than when unheated members or cooled members are employed. When these members are properly heated, the edges of the sheet are very smooth and free from fire cracks, which is not the case when unheated members or cooled members are employed. An edge of this character is advantageous as the amount of breakage is reduced. The truncating or cutting away of the ends of the triangular members has also proven of advantage in giving an edge which is smooth and well rounded. In practice the glass from behind the rolls presses out into the spaces 33 so that the sheet produced is of a width from one to two inches greater than the distance between the inner faces of the closure members.

Due apparently to the tendency of the edges of the sheet to cool more rapidly upon their upper sides than on their lower sides, these edges have a tendency to turn up slightly. This is almost imperceptible, but tends to cause breakage when the sheets of glass produced are ground and polished. In order to counteract this tendency, the flattening rolls 12 are preferably employed at the edges of the sheet in opposition to the rolls 10. When the glass sheet reaches this point, it is still red hot and plastic so that the edges may be flattened by the application of a slight amount of pressure. The roll 12 at each side of the sheet is carried by a pin 34 mounted in the end 35 of the lever 36. This lever is pivoted on the end of the roll 7 and the necessary amount of pressure is secured by means of the adjustable counterweight 37. After the edges are flattened, the sheet passes on through the flattening and annealing leer 13 preferably of the type illustrated and more fully described in my application heretofore referred to.

Figs. 8 and 9 illustrate a modification involving the use of a metal lip only on the lower side of the stream of glass passing to the rolls. This lip 38 is chilled by air from the pipe 39 in the same manner as in the construction heretofore described, and a clay lip 40 constituting a part of the outlet member 41 opposes the metal lip. In this construction the hollow metal closure members 42 at the ends of the rolls are differently supported as indicated in Fig. 9. The shanks 43 of these members are bolted to brackets 44 carried by the supporting framework 45.

Figs. 10 and 11 illustrate still another modification which differs from that of Fig. 1 in that the metal lips between the outlet member and the rolls are omitted and in place thereof transverse pipes 46 and 47 are employed which contact with the surface of the glass and cool it, a cooling medium such as water or air being circulated through the pipes in such way as to give the desired cooling effect. The hollow end closure members 48 are the same in construction as those of Figs. 8 and 9 and supported in the same manner as indicated in Fig. 9. The pipes 46 and 47 are supplied from the inlets 49 and 50 connected to the pipes intermediate their ends. The pipes 46 and 47 discharge at both ends through the outlets 51 and 52 (Fig. 11).

Figs. 12 and 13 illustrate another arrangement for cooling the layer of glass intermediate the slot member 53 and the rolls. In this construction the metal lips of Fig. 1 and the pipes 46 and 47 of Fig. 10 are omitted, and in place thereof, a pair of air pipes 54 and 55 are employed, which pipes are perforated so as to direct jets of air into the cracks or clearance spaces 56 and 57 lying between the rolls and the clay lip of the outlet member 53. In this manner a chilling effect is secured upon the layer of glass passing to the rolls and the tendency to incorporate air bubbles into the sheet is reduced. This modification for controlling the temperature is not as desirable as those heretofore described because of the difficulty of securing exactly the right degree of temperature modification, the tendency being to cool the glass either too much or too little. Metal closure members 58 similar to those of Fig. 9 are employed, such members also being similarly supported from the slot member frame 45.

What I claim is:

1. The combination with a tank adapted to carry a bath of molten glass, and rolling means at one side thereof for forming a ribbon or sheet of glass, of a clay outlet member constituting the end wall of the tank intermediate the glass bath and the rolling means and provided with an outlet opening for conducting the glass to the rolling means, means for removably supporting the said member so that it may be moved edgewise to and from its position of use and adjusted vertically, and a cut-off gate to the rear of said outlet member adapted when lowered to cut off the flow of glass to said outlet member.

2. The combination with a tank adapted to carry a bath of molten glass, and rolling means at one side thereof for forming a ribbon or sheet of glass, of a clay outlet member constituting the wall of the tank intermediate the glass bath and the rolling means, a metal supporting framework for the outlet member, and means engaging such framework for removably supporting the slot member from above so that it may be removed or replaced by moving it edgewise.

3. In combination with a tank adapted to carry a bath of molten glass, and having an outlet through one of its walls, of a pair of cooled driven rolls in opposition to the outlet, closure members for the angular spaces between the rolls at the ends thereof, and heating devices for said members.

4. The combination with a tank adapted to carry a bath of molten glass, and having an outlet through one of the walls, of a pair of cooled driven rolls in opposition to the outlet, metal closure members for the angular spaces between the rolls at the ends thereof, and means for applying a gas heating flame to said members.

5. The combination with a tank adapted to carry a bath of molten glass, and having an outlet through one of the walls, of a pair of cooled driven rolls in opposition to the outlet, hollow metal closure members for the angular spaces between the rolls at the ends thereof, and means for supplying a mixture of gas and air to the interior of said members to heat them.

6. The combination with a tank adapted to carry a bath of molten glass, and having an outlet through one of its walls, of a pair of cooled driven rolls in opposition to the outlet, metal closure members for the angular spaces between the rolls at the ends thereof but out of contact therewith, and devices for heating said members.

7. The combination with a tank adapted to carry a bath of molten glass, and having an outlet through one of its walls, of a pair of cooled driven rolls in opposition to the outlet, metal closure members for the angular spaces between the rolls at the end thereof arranged to close such spaces except at the extreme forward ends of said spaces, and means for heating said members.

8. The combination with a tank adapted to carry a bath of molten glass, and having an outlet through one of its walls, of a pair of cooled driven rolls in opposition to the outlet, triangular metal closure members fitting between the rolls at the ends thereof with the forward ends of the members cut away or truncated, and means for heating said members.

9. The combination with a tank adapted to carry a bath of molten glass, and having an outlet through one of the walls, of a pair of cooled driven rolls in opposition to the outlet with the pass thereof under the head pressure of the tank, and means for cooling the surface of the glass before it engages the rolls, the width of said outlet being greater than the width of the pass between the rolls.

10. The combination with a tank adapted to carry a bath of molten glass, and having an outlet through one of its walls, of a pair of cooled driven rolls in opposition to the outlet with the pass thereof under the head pressure of the tank and means for cooling the lower surface of the glass passing from the outlet opening to the rolls before such surface engages the roll, the width of said outlet being greater than the width of the pass between the rolls.

11. The combination with a tank adapted to carry a bath of molten glass, and having an outlet through one of the walls, of a pair of cooled driven rolls in opposition to the outlet with the pass thereof under the head pressure of the tank, and means for cooling the glass intermediate the outlet member and the rolls, the width of said outlet being greater than the width of the pass between the rolls.

12. The combination with a tank adapted to carry a bath of molten glass, and having an outlet through one of its walls, of a pair of cooled driven rolls in opposition to the outlet, a lip extending between the rolls over which the glass passes on its way to the rolls, and means for varying the temperature of such lip.

13. The combination with a tank adapted to carry a bath of molten glass, and having an outlet through one of its walls, of a pair of cooled driven rolls in opposition to the outlet, a pair of opposing metal lips extending between the rolls, and means for modifying the temperature of such lips.

14. The combination with a tank adapted to carry a bath of molten glass, and having an outlet through one of its walls, of a pair of cooled driven rolls in opposition to the outlet, a metal lip extending between the rolls over which the glass passes on its way to the rolls, and means for varying the temperature of such lip.

15. The combination with a tank adapted to carry a bath of molten glass, and having an outlet through one of its walls, of a pair of cooled driven rolls in opposition to the outlet, a lip extending between the rolls over which the glass passes on its way to the rolls, and means for chilling such lip.

16. The combination with a tank adapted to carry a bath of molten glass, and having an outlet through one of its walls, of a pair of cooled driven rolls in opposition to the outlet, a pair of opposing metal lips between the outlet member and the rolls and extending into the space between the rolls, and means for chilling such lips.

17. The combination with a tank adapted to carry a bath of molten glass and having an outlet through one of its walls, of a pair of cooled driven rolls in opposition to the outlet, a runway in advance of the rolls for receiving the sheet or ribbon of glass formed between the rolls and roller means engaging the upper side of the ribbon at the edges only for flattening such edges.

18. The combination with a tank adapted to carry a bath of molten glass and having an outlet through one of its walls, of a pair of cooled driven rolls in opposition to the outlet, a series of rollers in advance of said rolls for receiving the sheet or ribbon formed between the rolls and roller means in opposition to one of said rollers engaging the upper side of the ribbon at the edges only for flattening such edges.

In testimony whereof, I have hereunto subscribed my name this 2nd day of May, 1923.

FREDERICK GELSTHARP.